United States Patent
Standley

(10) Patent No.: US 7,277,602 B1
(45) Date of Patent: Oct. 2, 2007

(54) METHOD AND SYSTEM FOR PIXEL BUS SIGNALING IN CMOS IMAGE SENSORS

(75) Inventor: David Standley, Westlake Village, CA (US)

(73) Assignee: Biomorphic VLSI, Inc., Westlake Village, CA (US)

( * ) Notice: Subject to any disclaimer, the term of this patent is extended or adjusted under 35 U.S.C. 154(b) by 821 days.

(21) Appl. No.: 10/459,266

(22) Filed: Jun. 11, 2003

Related U.S. Application Data

(60) Provisional application No. 60/455,168, filed on Mar. 17, 2003, provisional application No. 60/455,183, filed on Mar. 17, 2003.

(51) Int. Cl.
   G06K 7/00 (2006.01)
   G06K 9/00 (2006.01)
(52) U.S. Cl. .................................................... 382/312
(58) Field of Classification Search ................ 382/162, 382/164, 166, 167, 213, 223, 254, 264, 266, 382/268, 300, 302, 312; 358/515, 518; 348/223.1
   See application file for complete search history.

(56) References Cited

U.S. PATENT DOCUMENTS

| | | | |
|---|---|---|---|
| 5,062,000 A | 10/1991 | Harris et al. ................ 358/213 |
| 5,832,117 A | 11/1998 | Harris et al. ................ 382/223 |
| 6,721,000 B1 * | 4/2004 | Lin et al. ................... 348/223.1 |
| 7,034,874 B1 * | 4/2006 | Reinhart et al. ............ 348/246 |
| 2002/0063899 A1 * | 5/2002 | Acharya et al. ............. 358/302 |
| 2003/0133029 A1 * | 7/2003 | Booth, Jr. ................... 348/294 |

FOREIGN PATENT DOCUMENTS

TW   NI-160321   8/2002

* cited by examiner

Primary Examiner—Amir Alavi
(74) Attorney, Agent, or Firm—Klein, O'Neill & Singh, LLP; TJ Singh

(57) ABSTRACT

A method and system for inter-processor communication in a pixel array in a CMOS sensor is provided. The system includes a bus for transmitting information between a first processor and a second processor, wherein such information is used for performing image processing operations in the pixel array in an analog domain. The bus may be a pixel read-out bus and/or an access bus. The information is used to perform outlier detection, bad pixel detection, and/or bad pixel correction in the analog domain, or any other image processing operation. The method includes sharing information between a first and a second processor; and using the information to perform image processing operations in an analog domain.

20 Claims, 8 Drawing Sheets

METHOD AND SYSTEM FOR PIXEL BUS SIGNALING IN CMOS IMAGE SENSORS

CROSS REFERENCE TO RELATED APPLICATION

This patent application is related to the provisional patent applications filed on Mar. 17, 2003, Ser. Nos. 60/455,168; and 60/455,183; entitled "Automatic Bad Pixel Correction in CMOS Image Sensors" and "Pixel Bus Signaling Scheme For CMOS Image Sensors With Embedded Processing", respectively; Ser. No. 10/459,092, entitled "Automatic Bad Pixel Correction in Image Sensors" filed on even date herewith. The disclosures of the foregoing applications are incorporated herein by reference in their entirety.

BACKGROUND OF THE INVENTION

1. Field of the Invention

This invention relates to image processing, and more particularly, to a pixel bus signaling scheme for CMOS image sensors.

2. Background

Digital cameras are commonly used today. Typically, a digital camera uses a sensor that converts light into electrical charges. Image sensors consist of an array of detectors and each detector converts light to an electronic signal. Image sensors also include the means to scan 2-D data to an output port of the digital camera.

There are two kinds of image sensors that are currently used in digital cameras. These are based on CCD and CMOS technologies. CCD sensors combine the tasks of light conversion and array transfer in a single device using a MOS Capacitor. CMOS sensors rely on diodes or transistors to convert light into electrical signals and include switches and amplifiers in the pixel to transmit data.

To represent a high quality color image, each pixel in a pixel array must contain tri-stimulus color data (for example, red, green, and blue). Generating such data in a digital camera requires that each light detector location in an image sensor produce data for three colors. Such a system is quite complex and expensive to build. To reduce system complexity, color image sensors commonly used in digital cameras (both video and still) use a mosaic pattern of single colored light detectors, typically red, green and blue. Each detector location produces only one of the three required colors.

FIG. 1A depicts one such mosaic pattern 100A, commonly referred to as a "Bayer pattern" In pattern 100A, each detector location collects red (R), green (G), or blue (B) light. Green light detectors are more abundant than red and blue detectors to match the characteristics of human visual system. To create a full color image the two "missing colors" at each location are inferred through an interpolation process using data from neighboring detector locations. This data is further processed through a color reconstruction algorithm to make a presentable picture.

Pixel detectors for CMOS imagers are initially biased in a reverse direction. The carriers produced by photons discharge the reverse bias. Detector voltages after exposure are a measure of the intensity of light incident on a particular detector. All pixels should produce equal output if uniform light is used to illuminate an ideal image sensor. However, in real devices some pixels produce a higher or lower output voltage than the average value produced by the image sensor. Pixels in an image created by the image sensor that appear brighter than the rest are often described as "hot or white" pixels. Pixels whose output is below an average value are often referred to as "cold or dark" pixels. Both hot and cold detectors produce blemishes in image data and are referred to as "Bad Pixels" herein.

FIG. 3 shows a flow diagram of various process steps that occur in conventional image processing systems. Based on auto-focus step S302B, an image sensor detects pixel values in step S300. In step S301, a dark current value is subtracted to reduce the noise introduced by the image sensor. In step S302, bad pixel correction is performed by an image-processing unit, and white balancing occurs in step S303. Note that bad pixel correction is applied to Bayer image (FIG. 1) readout after dark current compensation. Also, the correction is applied before color interpolation to avoid spreading bad pixel values during the interpolation process.

In step S304, color interpolation is performed. In step S305, black level flare correction is performed, and then color correction is performed in step S306. In step S307, gamma correction is performed, and edge enhancement is performed in step S308. In step S309, color space conversion occurs and then compression unit 206 compresses image data.

The foregoing process steps (or a majority of them) can be performed in the digital domain. In the digital domain, the raw analog signal from the detectors is converted into a digital signal by an analog-to-digital converter. Then all necessary processing is performed by digital circuitry. This is typical in a CCD device. Conventional CMOS sensors also perform these steps in the digital domain. But CMOS allows the analog-to-digital converter and digital processing to be integrated within one monolithic device, which provides a cost advantage over a CCD-based system. Furthermore, CMOS also allows processing to be performed in the analog domain, so that the analog-to-digital converter output needs less digital processing. This can lead to a significant power saving. Hence, in CMOS sensors, it is desirable to perform various image processing operations in the analog domain. This would require efficient inter-processor communications. Conventional CMOS sensors do not provide efficient inter-processor communication.

Therefore, there is a need for a system and method for efficient inter-processor communication in CMOS sensors so that various image processing operations can be performed efficiently in the analog domain.

SUMMARY OF THE INVENTION

In one aspect of the present invention, a system for inter-processor communication in a pixel array in a CMOS sensor is provided. The system includes a bus for transmitting information between a first processor and a second processor, wherein such information is used for performing image processing operations in the pixel array in an analog domain. The bus may be a pixel read-out bus and/or an access bus. The information is used to perform outlier detection, bad pixel detection, and/or bad pixel correction in the analog domain, or any other image processing operation.

In another aspect of the present invention, a method for inter-processor communication in a pixel array in a CMOS sensor is provided. The method includes sharing information between a first and a second processor; and using the information to perform image processing operations in an analog domain.

In one aspect of the present invention, efficient inter-processor communication is provided such that complex operations, like outlier detection and/or bad pixel correction (or any other operation) can be performed in the analog domain.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit, the invention. The drawings include the following Figures.

DETAILED DESCRIPTION OF THE PREFERRED EMBODIMENTS

To facilitate an understanding of the preferred embodiment, the general architecture and operation of a digital camera system will be described. The specific architecture and operation of the preferred embodiment will then be described with reference to the general architecture of the digital camera system.

Overall System

Figure 2:
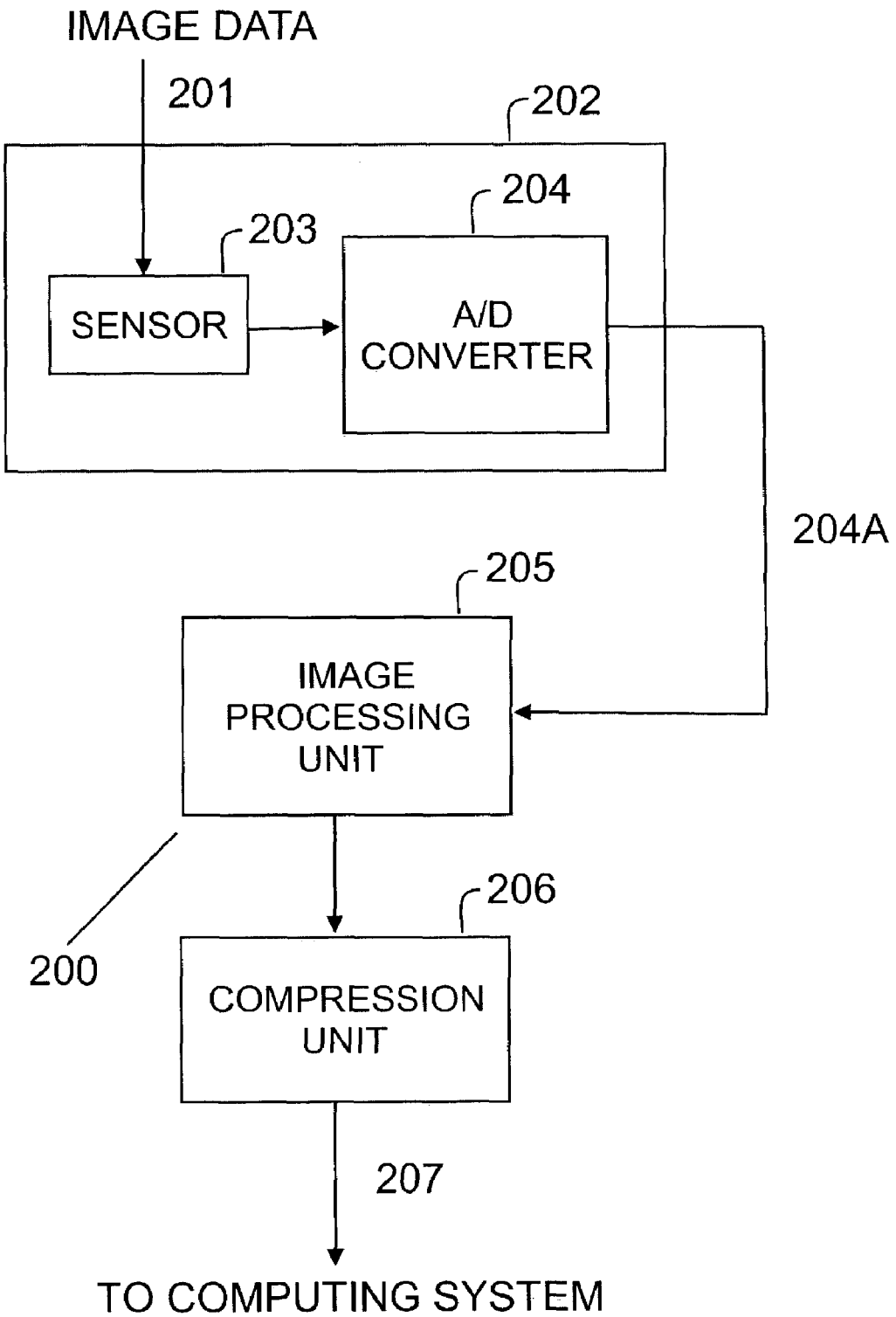
FIG. 2 is a block diagram of a digital camera system used according to one aspect of the present invention.
Figure 3:
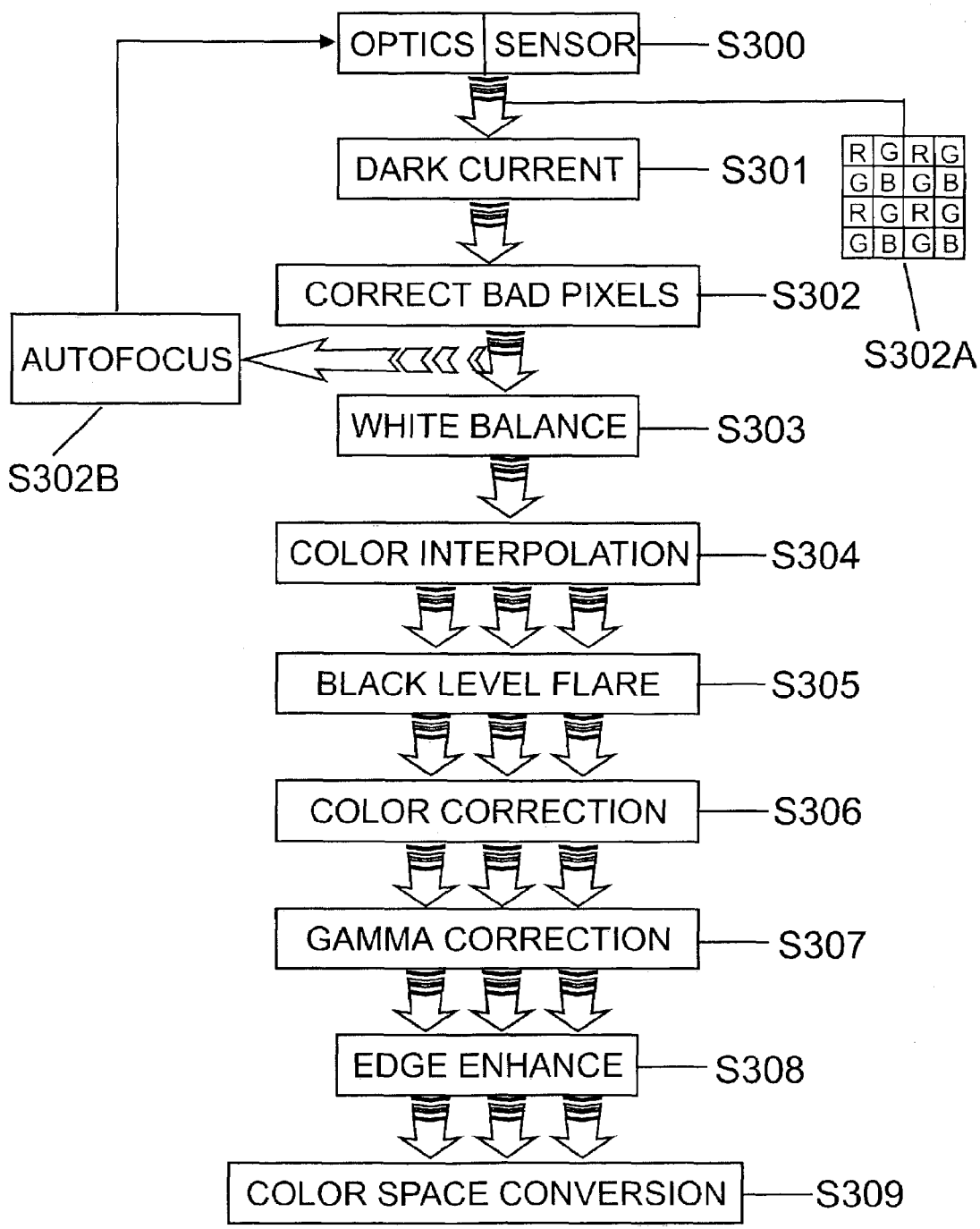
FIG. 3 is a top-level flow diagram showing various process steps involved in image processing.

FIG. 2 shows a block diagram of a digital camera system 200 that receives image data 201 via image capturing unit 202. Image capturing unit 202 includes an image sensor 203 and analog/digital (A/D) converter 204. Image sensor 203 captures raw pixel values of images as analog data, which is converted into digital data by A/D converter 204. Digital image data 204A is then sent to an image-processing unit 205 and thereafter to a compression unit 206. Compression unit 206 may include a processor or specialized ASIC to compress data. Compressed image data 207 is then sent to a computing system (not shown) for viewing and/or processing.

The foregoing only provides a top-level description of a digital camera system. As is well known in the art, flash memory may be used by the digital camera system to store images. Also, the various units on FIG. 2 may be included on a single chip or embedded microprocessor.

Figure 1A:
FIG. 1A shows a block diagram of a Bayer Mosaic image pattern, used according to one aspect of the present invention.
Figure 1B:
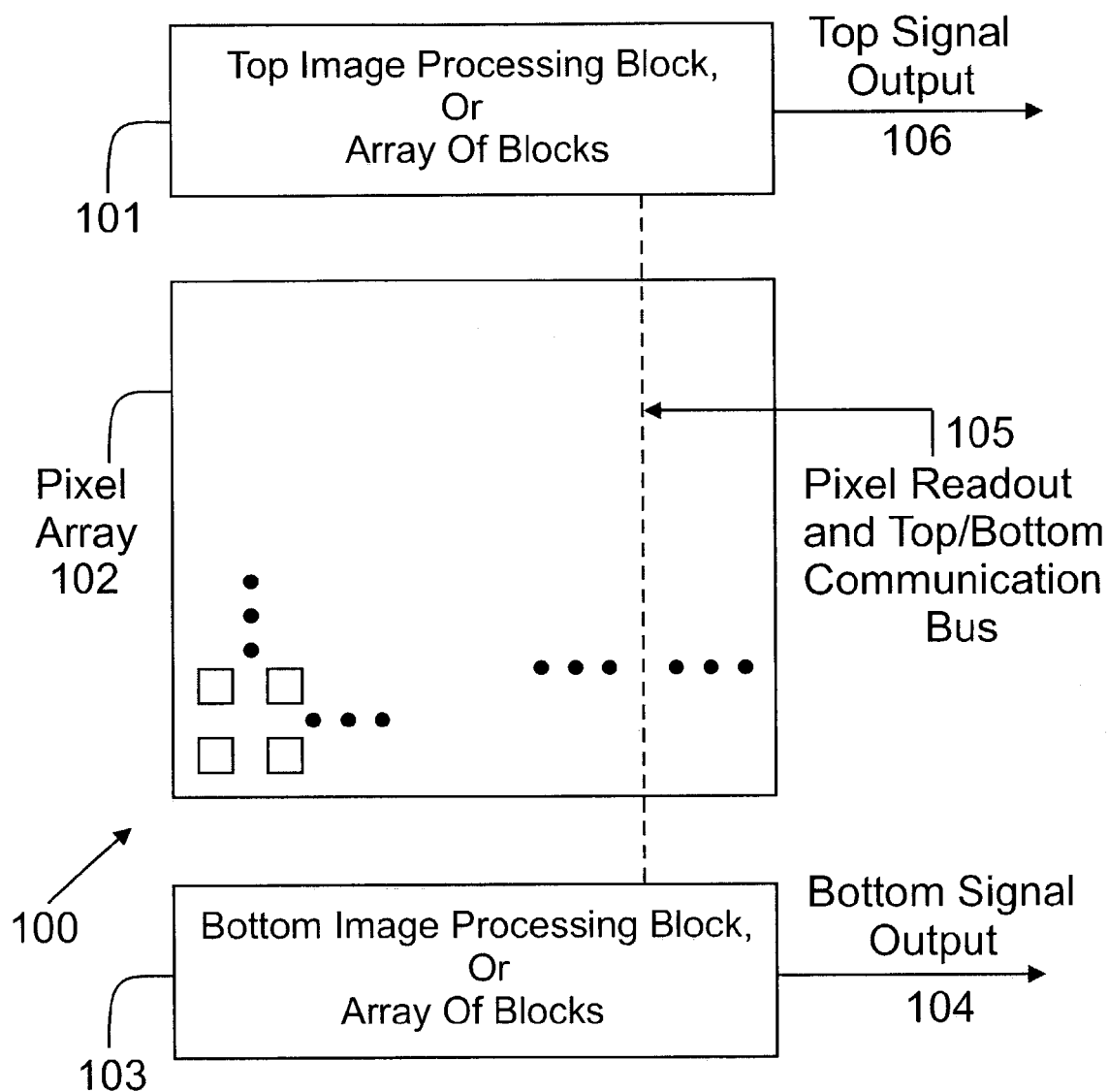
FIG. 1B shows a block diagram showing a pixel read out bus used for communication between top and bottom processors, according to one aspect of the present invention.

FIG. 1B shows the general architecture of a system 100 that allows communication between top and bottom processors. System 100 includes a pixel array 102 with a top image processing block ("top block") 101 and a bottom image processing block ("bottom block") 103. Top block 101 generates signal 106, while bottom block generates signal 104. Pixel readout bus 105 is used for communication between bottom and top processors 101 and 103, respectively, as described below.

Figure 1C:
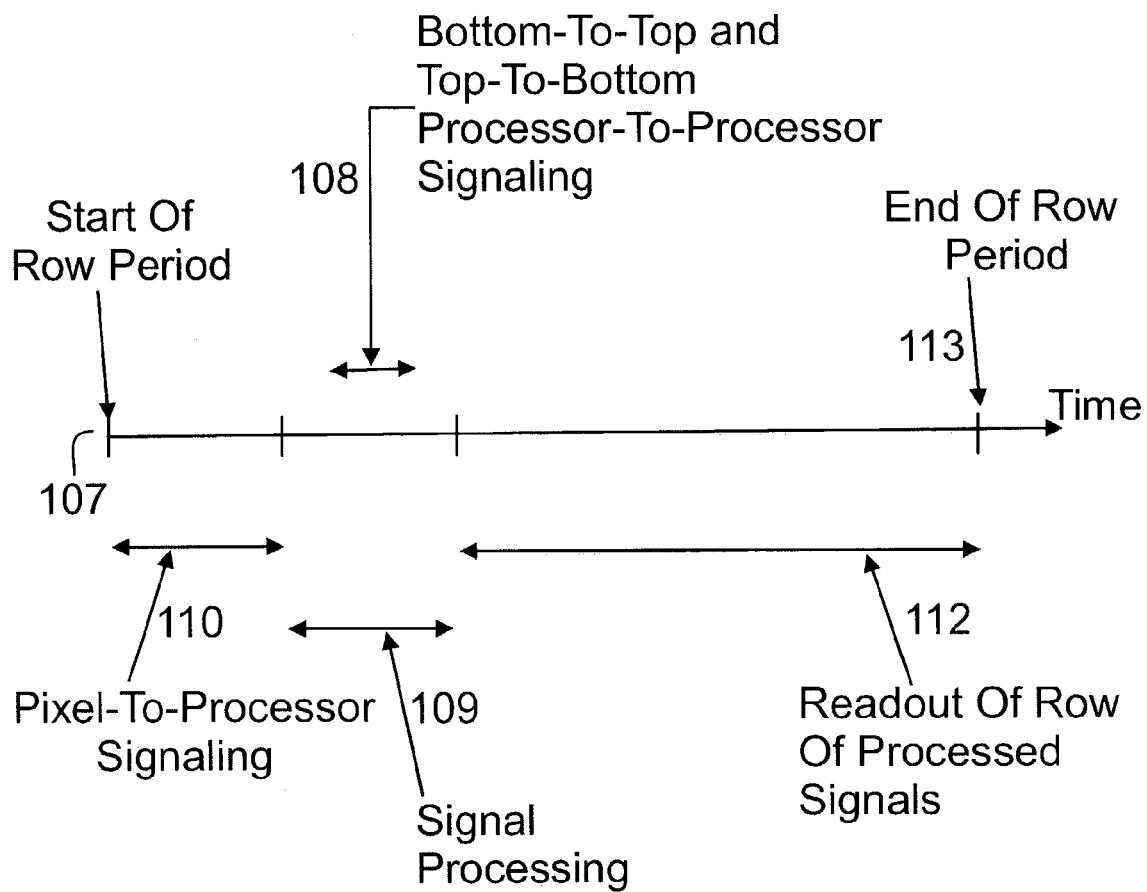
FIG. 1C shows a timing diagram for inter-processor communication, according to one aspect of the present invention.

FIG. 1C shows an example of the timing for bus 105 signaling relative to the timing of an entire row (or other segment) of an image. Typically, imaging devices have the following event sequence. First, all pixels in a given row are selected (107), and then pixel-to-processor signaling occurs (110); i.e., the pixel outputs are sent to image processing blocks (101 and 103) on two sides of the array. Second, signal processing (109) occurs inside these processing blocks. Third, the processed image data is read out (112), generally in a sequential fashion.

In the present invention, the second interval includes a portion for signaling (108) between the two processing blocks; i.e. bottom-to-top and top-to-bottom communication. This "subinterval" 108 does not overlap with the first interval.

In this example, none of the three main intervals overlap. However, this is not required, for example, the first and second intervals can overlap, and so the processor can eliminate readout noise. The subinterval should not overlap with the first interval.

Figure 4A:
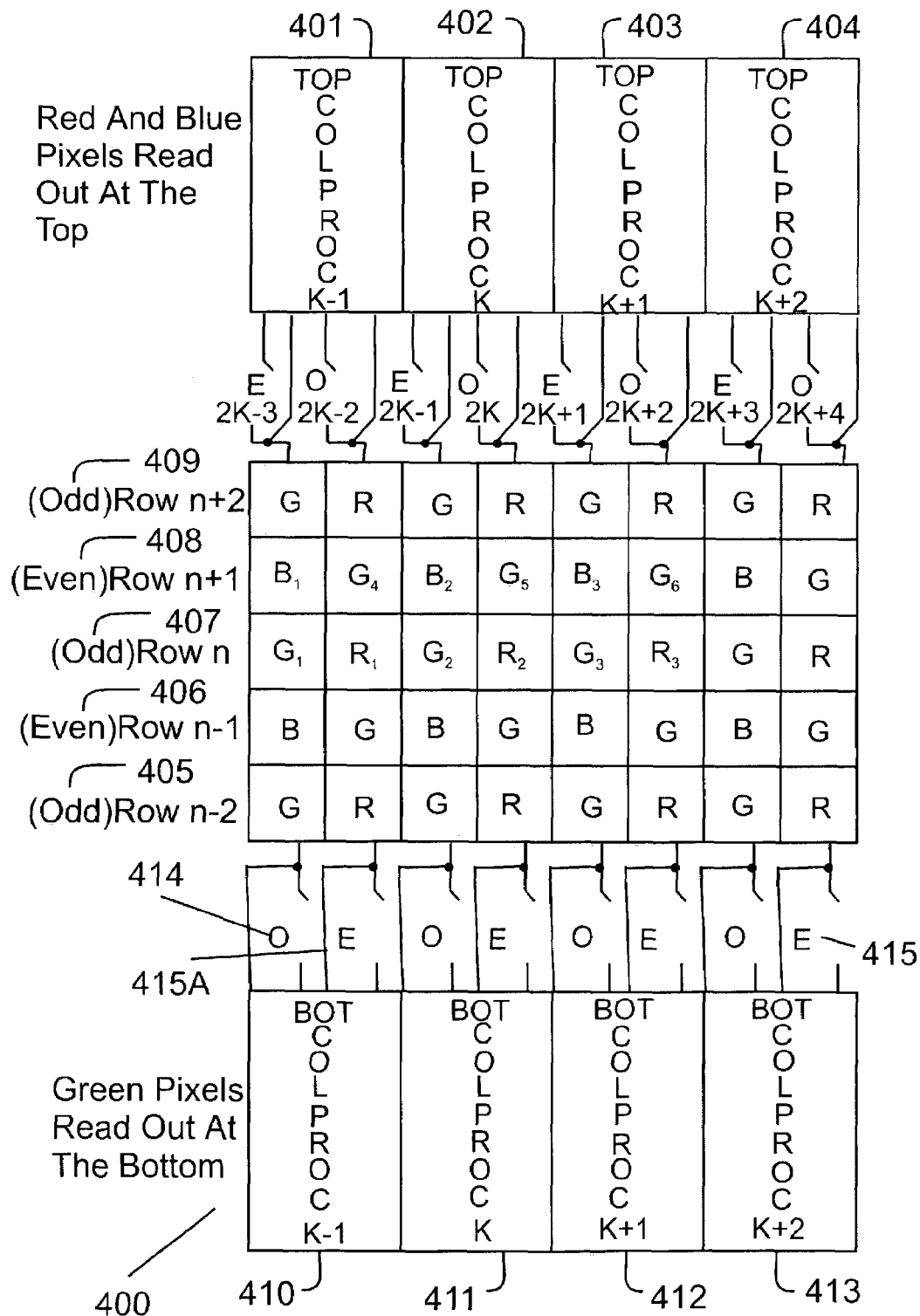
FIG. 4A shows a block diagram of a pixel array read out architecture, according to one aspect of the present invention.

FIG. 4A shows an example of pixel array readout and processing architecture 400 used according to various adaptive aspects of the present invention. A Bayer color filter pattern (100A) is used over the pixel array, and there are processor units for each pair of columns ("column processor" or "COLPROC" units). The top column processor array is shown as 401-404, while the bottom processor array is shown as 410-413.

All green pixels are read out at the bottom, while red and blue pixels are read out at the top. Each column processor unit receives signals from two adjacent columns of pixels through two separate switches, O (for example, 414) and E (for example, 415). Each row in the array can be indexed sequentially and considered either an odd or even row. In this example, odd ("O") rows are designated as 405, 407 and 409, while even ("E") rows are designated as 406 and 408. If the row being read out is odd, then all switches labeled "O" will turn on, and all labeled "E" will turn off; or vice versa if the row being read out is even. Column processor array (410-413) at the bottom operates on the data for all green pixels, and the column processor array at the top (401-404) operates on data for all red and blue pixels (one at a time for alternate rows). Processor to processor communication is shown as link 415A.

In the present invention, in one aspect, each readout bus provides a connection between each column processor on the bottom and the top, which allows various image processing steps to be performed efficiently in the analog domain.

Figure 4B:
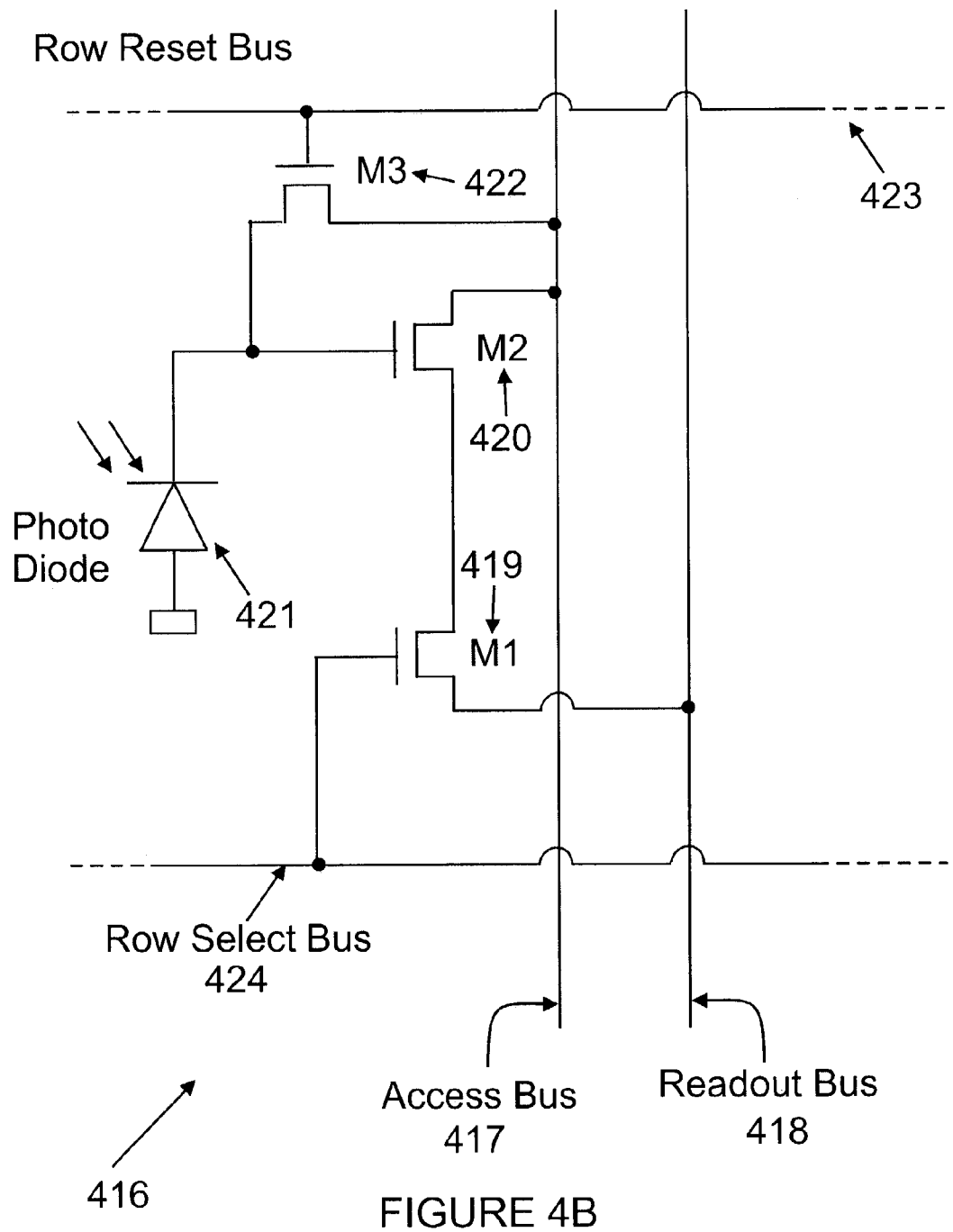
FIG. 4B shows a schematic for a pixel array structure, used for inter-processor communication, according to one aspect of the present invention.

FIG. 4B shows a schematic of a three-transistor active pixel structure ("APS") 416 used in CMOS sensors. Transistors 419, 420 and 422 are labeled M1, M2, and M3.

Readout bus 418 and the power supply or "access" bus 417 are vertical. Two other required signals, row reset and row select, are on horizontal busses 423 and 424, respectively. For the aforementioned communication between top and bottom column processors, either the access bus 417 and/or readout bus 418 can be used, according to the present invention.

In a preferred embodiment, the readout bus 418 is used, as transistor M1 419 can isolate readout bus 418 and photodiode 421, if the row select bus 424 is held low. This prevents any large voltage swing signal on the readout bus 418 from disturbing the photodiode signal, which it otherwise might do if the photodiode signal is near an extreme of its range. For this type of pixel 416, photodiode 421 is typically run in the reverse bias domain.

Figure 4C:
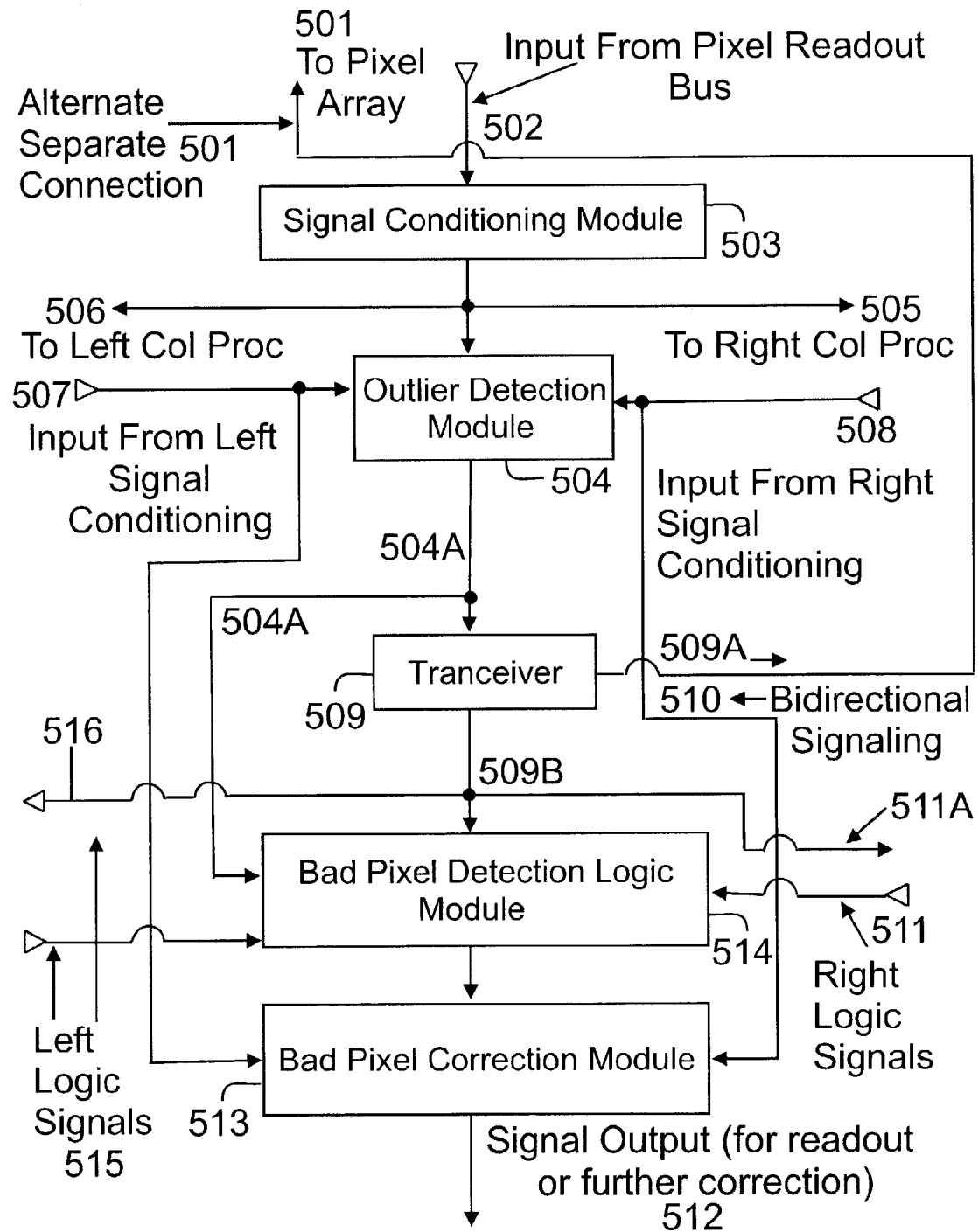
FIG. 4C shows a block diagram of a system for inter-processor communication for performing image processing operations in the analog domain, according to one aspect of the invention.

FIG. 4C provides an illustration of one aspect of the present invention with respect to specific image processing operations, namely, outlier detection and bad pixel correction. It is noteworthy that the process steps of performing outlier detection and bad pixel correction have been described in co-pending application entitled, "Automatic Bad Pixel Correction In Image Sensors", Ser. No. 10/459,092, incorporated herein by reference in its entirety. Although the example in FIG. 4C is shown with respect to outlier detection and bad pixel correction, the present invention is not limited to just these operations. The adaptive aspects of the present invention may be used with other operations, for example, edge enhancement or color reconstruction.

Turning in detail to the block diagram of FIG. 4C, signal-conditioning module 503 receives signal 502 that is input from a pixel read out bus (for example, 418). Signal 502 can be from either the top or bottom processor depending upon which processor is being considered. Output from signal-conditioning module 503 is sent to outlier detection module 504, which compares pixel intensity of a pixel with that of its neighbors on the left and right to determine if the pixel in question is sufficiently different from its neighbors. For example, consider pixel G2 in FIG. 4A that is processed by bottom processor 411. If G2 is brighter (or darker) than both G1 and G3 by a given threshold, it is considered to be an outlier pixel.

Outlier detection module 504 receives input 507 generated from a signal conditioning module (e.g. 503) for a pixel on the left of the pixel that is being processed (for example, G2) at a given time. Input 508 is received from a pixel on the right of the pixel that is being processed at a given time. Signals 507 and 508 are used for outlier detection.

An outlier pixel may also be a bad pixel; for example, it could be a leaky pixel. But an outlier pixel can also be part of a thin line (for example, two pixels wide) in an image as it registers two different colors. In order to prevent such lines from being classified as bad, the following filter may be used. If G2 is an outlier, it is classified as bad only if neither of the red pixels R1 or R2 is considered outliers (i.e., neither of the two adjacent pixels on the left and the right). Hence, if G2 is a sole outlier pixel, it is considered bad. To implement this logic, information about pixels R1 and R2 is received from top column processors. This is performed by transceiver 509 and bad pixel detection logic block 514.

Bad pixel detection module 514 receives signal 515 from the column processor on the left, signal 511 from the column processor on the right, and signal 504A from outlier detection module 504. It also receives signal 509B from the top processor via transceiver 509.

If a pixel is determined to be bad, then bad pixel correction block 513 replaces it with an estimate of the value, typically based on neighboring values of the same color. In a preferred implementation, the value on the left or right is used as the replacement. Alternately, any of the more sophisticated prior art circuits can be used, such as that disclosed in U.S. Pat. No. 5,832,117 (Harris et al). Bad pixel correction module 513 uses signals 507 and 508 to replace the bad pixels. Signal 512 is then output for further processing.

As discussed above with respect to pixel G2 that is processed by bottom processor 411, pixel B2 is processed by top processor 402. Transceiver 509 in each bottom block sends outlier pixel data 509A to the top of the array for its gating logic so that outlier detection and bad pixel correction can be performed efficiently. (Note that a transceiver can use one line, as in FIG. 4C, or two lines, as depicted in FIG. 4A.)

FIG. 4C shows only one example of a system incorporating the present invention. Anything using communication between two sides of a pixel array can benefit from the system. Also, by keeping the signal analog, further analog processing, such as color reconstruction, can also be performed efficiently in the analog domain. Also, the invention is not limited to any particular pixel array pattern, for example, a Bayer pattern as described above.

Although the present invention has been described with reference to specific embodiments, these embodiments are illustrative only and not limiting. Many other applications and embodiments of the present invention will be apparent in light of this disclosure and the following claims.

What is claimed is:

1. A system for inter-processor communication in a CMOS sensor, comprising:
   a pixel array;
   a first processor connected to the pixel array;
   a second processor connected to the pixel array;
   a bus connected to the first processor and the second processor for transmitting information between the first processor and the second processor, wherein such information is used for performing image processing operations on the pixel array in an analog domain.

2. The system of claim 1, wherein the bus is a pixel read-out bus.

3. The system of claim 1, wherein the bus is an access bus.

4. The system of claim 1, wherein the information is used to perform outlier detection in the analog domain.

5. The system of claim 1, wherein the information is used to perform bad pixel detection in the analog domain.

6. The system of claim 1, wherein the information is used to perform bad pixel correction in the analog domain.

7. The system of claim 1, wherein the first processor is used for processing red and blue pixels and the second processor is used for processing green pixels.

8. The system of claim 1, wherein the pixel array is in a Bayer pattern.

9. The system of claim 1, wherein the pixel array is in a Non-Bayer pattern.

10. The system of claim 1, wherein the system includes a digital camera.

11. A method for inter-processor communication in a CMOS sensor with a pixel array, comprising:
    receiving information from the pixel array to a first processor;
    receiving information from the pixel array to a second processor;
    sharing information between the first processor and the second processor; and
    using the information to perform image processing operations in an analog domain.

12. The method of claim 11, wherein the first processor processes red and blue pixels.

13. The method of claim 11, wherein the second processor processes green pixels.

14. The method of claim 11, wherein a read out bus is used for sharing information between the first processor and the second processor.

15. The method of claim 11, wherein an access bus is used for sharing information between the first processor and the second bottom processor.

16. The method of claim 11, wherein outlier pixel detection is performed in the analog domain.

17. The method of claim 11, wherein bad pixel detection is performed in the analog domain.

18. The method of claim 11, wherein bad pixel correction is performed in the analog domain.

19. The system of claim 11, wherein the pixel array is in a Bayer pattern.

20. The system of claim 11, wherein the pixel array is in a Non-Bayer pattern.

* * * * *